US009082400B2

(12) United States Patent
Rezvani et al.

(10) Patent No.: US 9,082,400 B2
(45) Date of Patent: Jul. 14, 2015

(54) VIDEO GENERATION BASED ON TEXT

(75) Inventors: Behrooz Rezvani, San Ramon, CA (US); Ali Rouhi, Oakland, CA (US)

(73) Assignee: SEYYER, INC., San Ramon, CA (US)

( * ) Notice: Subject to any disclaimer, the term of this patent is extended or adjusted under 35 U.S.C. 154(b) by 454 days.

(21) Appl. No.: 13/464,915

(22) Filed: May 4, 2012

(65) Prior Publication Data

US 2013/0124206 A1 May 16, 2013

Related U.S. Application Data

(60) Provisional application No. 61/483,571, filed on May 6, 2011.

(51) Int. Cl.
*G10L 13/00* (2006.01)
*G10L 13/08* (2013.01)
*G06T 13/40* (2011.01)
*H04M 1/725* (2006.01)
*G10L 13/10* (2013.01)

(52) U.S. Cl.
CPC ............... *G10L 13/08* (2013.01); *G06T 13/40* (2013.01); *G10L 13/10* (2013.01); *H04M 1/72552* (2013.01); *H04M 1/72555* (2013.01)

(58) Field of Classification Search
CPC .................... G10L 2021/105; G10L 13/033
USPC ............................ 704/235, 258, 270; 345/473
See application file for complete search history.

(56) References Cited

U.S. PATENT DOCUMENTS

| 6,250,928 | B1 * | 6/2001 | Poggio et al. | 434/185 |
|---|---|---|---|---|
| 6,366,885 | B1 * | 4/2002 | Basu et al. | 704/270 |
| 6,449,595 | B1 * | 9/2002 | Arslan et al. | 704/235 |
| 6,539,354 | B1 * | 3/2003 | Sutton et al. | 704/260 |
| 6,735,566 | B1 * | 5/2004 | Brand | 704/256 |
| 6,813,607 | B1 * | 11/2004 | Faruquie et al. | 704/276 |
| 6,826,530 | B1 | 11/2004 | Kasai et al. | |
| 6,970,820 | B2 * | 11/2005 | Junqua et al. | 704/258 |
| 7,248,677 | B2 * | 7/2007 | Randall et al. | 379/93.23 |
| 7,636,662 | B2 * | 12/2009 | Dimtrova et al. | 704/260 |
| 7,664,645 | B2 * | 2/2010 | Hain et al. | 704/269 |
| 8,224,652 | B2 * | 7/2012 | Wang et al. | 704/275 |

(Continued)

FOREIGN PATENT DOCUMENTS

KR 10-2007-0117195 12/2007

OTHER PUBLICATIONS

Blanz, V., et al. A Morphabie Model for the Synthesis of 3D Faces, *Proceedings of the 26th Annual Conference on Computer Graphics and Interactive Techniques*, ACM Press/Addison-Wesley Publishing Co., pp. 187-194, 1999.

(Continued)

*Primary Examiner* — Shaun Roberts
(74) *Attorney, Agent, or Firm* — Perkins Coie LLP

(57) ABSTRACT

Techniques for generating a video sequence of a person based on a text sequence, are disclosed herein. Based on the received text sequence, a processing device generates the video sequence of a person to simulate visual and audible emotional expressions of the person, including using an audio model of the person's voice to generate an audio portion of the video sequence. The emotional expressions in the visual portion of the video sequence are simulated based a priori knowledge about the person. For instance, the a priori knowledge can include photos or videos of the person captured in real life.

22 Claims, 13 Drawing Sheets

(56) References Cited

U.S. PATENT DOCUMENTS

| | | | |
|---|---|---|---|
| 2002/0120450 A1 | 8/2002 | Junqua et al. | |
| 2003/0018475 A1* | 1/2003 | Basu et al. | 704/270 |
| 2005/0203743 A1 | 9/2005 | Hain et al. | |
| 2007/0254684 A1 | 11/2007 | Jiang | |
| 2009/1025248 | 10/2009 | Ekstrand | |
| 2010/1029667 | 11/2010 | El-Saban et al. | |
| 2010/0302254 A1 | 12/2010 | Min et al. | |
| 2011/0115799 A1 | 5/2011 | Imbruce | |
| 2011/0234825 A1 | 9/2011 | Liu et al. | |
| 2012/0327243 A1 | 12/2012 | Rezvani | |

OTHER PUBLICATIONS

Bregler, C., et al., Video Rewrite: Driving Visual Speech with Audio, Interval Research Corporation, *Proceedings of ACM SIGGRAPH 97*, pp. 1-8, Aug. 1997.
Chuang, E., et al., Head Emotion, Stanford Computer Science Technical Report, CSTR 2003-02 Apr. 7, 2003 Apr. 10, 2003.
Cootes, T.F., et al., Active Appearance Models, *Proc. European Conf. Computer Vision 1998*, 2:484-489, 1998.
Cootes, T.F., et al., Statistical Models of Appearance for Computer Vision, Imaging Science and Biomedical Engineering, *Technical Report*, University of Manchester, pp. 1-124. Mar. 8, 2004.
Huang, F. J., et al., "Real-time lip-synch face animation driven by human voice," IEEE Multimedia Signal Processing Workshop, Los Angeles, California, 1998.
Li, N., et al., "Lipreading Using Eigensequences," in *Proc. Int. Workshop Automatic Face Gesture Recognition*, pp. 30-34, 1995.
Matthems, I. et al., Extraction of Visual Features for Lipreading, *IEEE Transactions on Pattern Analysis and Machine Intelligence*, 24(2):198-213, Feb. 2002.
Pearson, K., On Lines and Planes of Closest Fit to Systems of Points in Space, Philosophical Magazine 2(6):559-572, 1901.
International Search Report PCT/US2012/036679 dated Nov. 23, 2012, pp. 1-3.
Written Opinion PCT/US2012/036679 dated Nov. 23, 2012, pp. 1-4.
Freund, Yoav and Schapire, Robert E.. Game Theory, On-line Prediction and Boosting. In Proceedings of the Ninth Annual Conference on Computational Learning Theory, pp. 325-332, 1996.
Viola, P. and Jones, M., Rapid Object Detection Using a Boosted Cascade of Simple Features. Coference on Computer Vision and Pattern Recognition (CVPR), 2001.
Linde,Y., Buzo A., and Gray, R. M., "An Algorithm for Vector Quantizer Design," IEEE Transactions on Commmunications, pp. 702-710, Jan. 1980.
Paliwal, K.K., Kleijn, W. B. "Quantization of LPC Parameters" in Speech Coding and Synthesis, Amsterdam: Elsvier Science B. V., 1995.
Spanias, A.S., "Speech Coding, a Tutorial Review", Proceedings of IEEE, Oct. 1994.
Wai C. Chu, "Speech Coding Algorithms: Foundation and Evolution of Standardized Coders", John Wiley and Sons, 2003.
Lopez-Soler, Juan M. et al, "Linear Inter-frame Dependencies for Very Low Bit-rate Speech Coding" Speech Communication 34 (2001) 333-349.
Rabiner, L.R., "A Tutorial on Hidden Markov Models and Selected Applications in Speech Recognition" , Proceedings of IEEE, Feb. 1989.
Klein, W. et al, "Vowel Spectra, Vowel Spaces, and Vowel Identification", Journal of Acoustical Society of America, vol. 48, 1970.
International Search Report PCT/US2011/066811 dated Aug. 17, 2012, pp. 1-3.
Written Opinion PCT/US2011/066811 dated Aug. 17, 2012, pp. 1-4.
Co-Pending U.S. Appl. No. 13/334,726 of Rezvani, B., filed Dec. 22, 2011.
Scholkopf, B., Smola, A.J. MJuller, K., 1998. Nonlinear Component Analysis as a Kernel Eigenvalue Problem. Neural Computation 10 (5), 1299-1399.
Supplementary Partial European Search Report mailed Dec. 18, 2014, for European Patent Application No. EP 12782015.7 filed May 4, 2012, 5 pages.
Extended European Search Report mailed Mar. 26, 2015, for European Patent Application No. EP 12782015.7 filed May 4, 2012, 15 pages.

* cited by examiner

VIDEO GENERATION BASED ON TEXT

RELATED APPLICATIONS

This application claims the benefit of U.S. Provisional Application No. 61/483,571, filed on May 6, 2011, which is incorporated herein by reference.

FIELD OF THE INVENTION

At least one embodiment of the present invention pertains to video generation, and more particularly, to a method and system for generating video to simulate visual and audible emotional expressions of a person realistically based on a text sequence such as a user-to-user short text message.

BACKGROUND

A digital video sequence can contain a very large amount of data. To transfer a video efficiently using current technology, a large transmission bandwidth is needed. However, data transmission bandwidth over a wireless medium is a limited and sometimes expensive resource.

For instance, Short Message Service ("SMS"), sometimes called "texting," is one of the most popular person-to-person messaging technologies in use today. SMS functionality is widely available in almost all modern mobile phones. However, SMS has a very limited capacity to transmit information; each SMS message has a fixed length of 140 bytes or 160 characters and therefore is not suitable for transmitting video data. Multimedia messaging service ("MMS") is a possible way to send messages that include multimedia content. However, MMS messaging cannot utilize existing SMS infrastructure, so it costs more than SMS messaging. It is difficult if not impossible to send a video message on very low bandwidth channels such as an SMS channel.

SUMMARY

The technology introduced here includes a technique and apparatus to generate a video sequence of a person based on a text sequence to simulate realistically the person speaking according to the text sequence, including realistically simulating visual and audible emotional expressions of the person based on the text sequence. The technique enables to produce the appearance of having transmitted a video of a person over a low-bandwidth channel (e.g., an SMS channel) without actually having to transmit video data over the channel.

Moreover, the technique provides a cost-effective way to produce a realistic, non-animated video of a person speaking (or singing, or making any other kind of vocalization). When the person is not available for various reasons, including scheduling conflicts, unwillingness, death and emergency situations, the technique provides a solution alternative to capturing a video of the person. In addition to certain a priori information about the person that is stored in a processing device, the technique only needs a text sequence to be able to generate the video and requires little data transmission if the text sequence ever needs to be transmitted. The text sequence provides a mechanism to control and tune the words and the emotional expressions that the person appears to utter in the video sequence, by adjusting the contents of the text sequence.

In one embodiment, a processing device receives a text sequence. Based on the received text sequence, the processing device generates a video sequence of a person to simulate visual and audible emotional expressions of the person, including using an audio model of the person's voice to generate an audio portion of the video sequence. The emotional expressions in the visual portion of the video sequence are simulated based a priori knowledge about the person. For instance, the a priori knowledge can include photos and/or videos of the person captured in real life.

In certain embodiments, the text sequence includes a set of words including at least one word. The video sequence is generated such that the person appears to utter the words in the video sequence. The text sequence can further include emotional indicators associated to one or more words. Each indicator indicates an emotional expression of the person at a time in the video sequence when the person appears to utter the word to which the indicator is associated in the video sequence. In certain embodiments, the processing device maps the words in the text sequence to facial features of the person, based on the a priori knowledge about the person. Then the processing device renders the facial features of the person in a background scene.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not necessarily all refer to the same embodiment.

Some related references include: "On Lines and Planes of Closest Fit to Systems of Points in Space," *Philosophical Magazine* 2 (6): 559-572, 1901, by K. Pearson; "Statistical Models of Appearance for Computer Vision," *Technical Report, University of Manchester*, 125 pages. 2004, by T. F. Cootes, C. J. Taylor; "Active appearance models," *Proc. European Conf. Computer Vision*, 2:484-489, 1998, by T. Cootes, G. Edwards, and C. Taylor; "A morphable model for the synthesis of 3d faces," *Proceedings of the 26th annual conference on Computer graphics and interactive techniques*, pages 187-194. ACM Press/Addison-Wesley Publishing Co., 1999, by V. Blanz and T. Vetter; "Head Emotion" *Stanford Computer Science Technical Report*, CSTR 2003-02, by Erica Chang and Chris Bregler; "Real-time lip-synch face animation driven by human voice," *IEEE Workshop on Multimedia Signal Processing*, 1998, by F. J. Huang and T. Chen; "Extraction of visual features for lipreading," IEEE Transactions on Pattern Analysis and Machine Intelligence, 2002, 24(2):198-213, by Matthews, I., Cootes, T., Bangham, A., Cox, S and Harvery, R.; "Lipreading using eigensequences," *Proc. Int. Workshop Automatic Face Gesture Recognition*, 1995, pp. 30-34, by N. Li, S. Dettmer, and M. Shah; Driving Visual Speech with Audio. Proceedings of SIGGRAPH 97, pages 353-360, August 1997, by Christoph Bregler, Michele Covell, and Malcolm Slaney; all of which are incorporated herein by reference in their entireties.

Figure 1A:
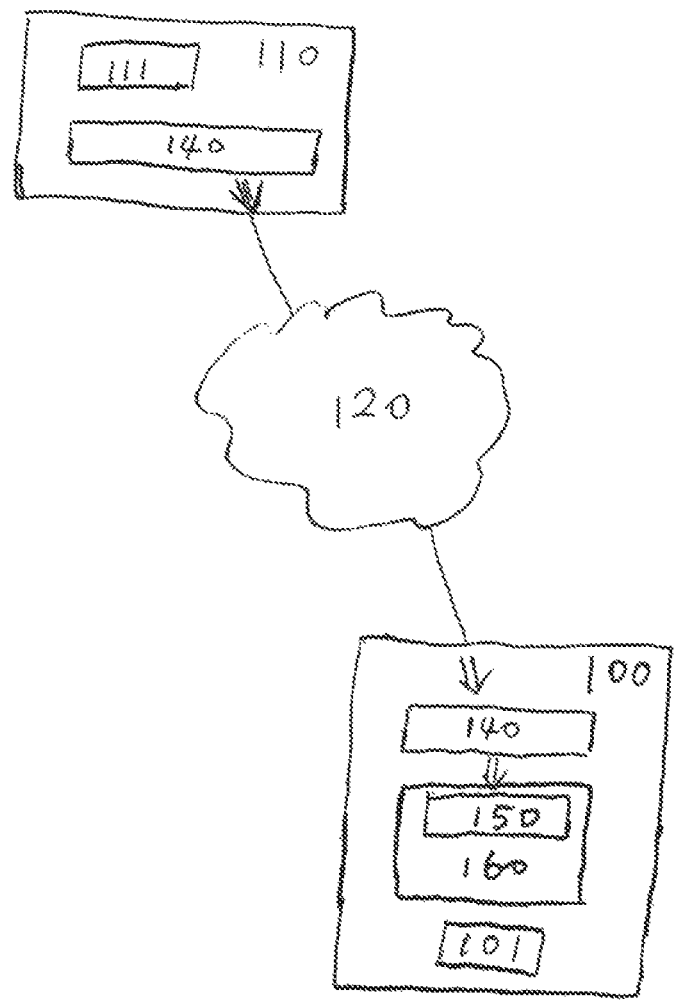
FIG. 1A illustrates an example of a processing device receiving a text sequence from a sending device.

FIG. 1A shows an example of a processing device and its environment in which the technique being introduced here can be implemented. In FIG. 1A, the processing device 100 is connected to a sending device 110 via an interconnect 120. The interconnect 120 may be, for example, a cellular phone network, an SMS channel, a television channel, a local area network (LAN), wide area network (WAN), metropolitan area network (MAN), global area network such as the Internet, a Fibre Channel fabric, or any combination of such interconnects. The sending device 110 is capable of sending a text sequence 140 to the processing device via the interconnect 120. The processing device 100 receives the text sequence 140 and generates a video sequence 150 based on the text sequence 140. Any of the sending device 110 and the processing device 100 may be, for example, a cellular phone, a conventional personal computer (PC), a server-class computer, a workstation, a handheld computing/communication device, a game console, a television, or the like.

The processing device 110 can include a storage device 160 to store the generated video sequence 150. The storage device 160 can be, for example, conventional dynamic random-access memory (DRAM), conventional magnetic or optical disks or tape drives, non-volatile solid-state memory, such as flash memory, or any combination of such devices.

Any of the processing device 100 and the sending device 110 can contain an operating system (101, 111) that manages operations of the processing device 100 and the sending device 110. In certain embodiments, the operating systems 101 and 111 are implemented in the form of software. In other embodiments, however, any one or more of these operating systems 101 and 111 may be implemented in pure hardware, e.g., specially-designed dedicated circuitry or partially in software and partially as dedicated circuitry.

A text sequence such as the text sequence 140 in FIG. 1 can include indicators (also called tags, emotional indicators, or emotional tags). Each indicator indicates an emotional expression of a person at a time in the video sequence when the person appears to utter the word in the video sequence. The indictor can be in different forms and can be selected by different ways. In one embodiment, an indicator is selected as an item from a menu of items to be associated with a word within the text sequence, wherein each item in the menu is an indicator suggesting an emotional expression of the person. In another embodiment, an indicator is identified by inserting a markup language string to be associated with a word within the text sequence, wherein the markup language string is from a predetermined set of markup language strings, and each markup language string in the predetermined set of markup language strings is an indicator suggesting an emotional expression of the person. In yet another embodiment, an indicator is identified on an audio sequence of a speaker speaking the word within the text sequence, by using an automatic speech recognition (ASR) engine.

Figure 1B:
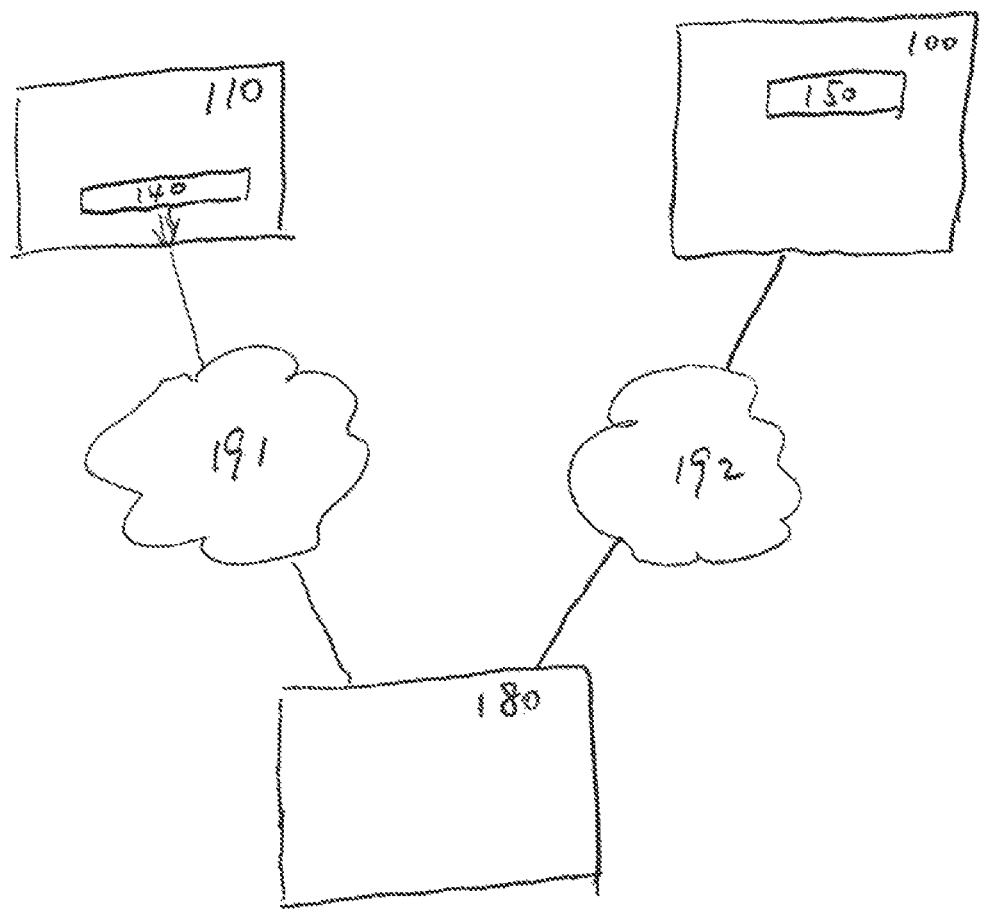
FIG. 1B illustrates an example of a processing device receiving a text sequence from a sending device via an intermediary device.

FIG. 1B illustrates an example of a processing device receiving a text sequence from a sending device via an intermediary device. In FIG. 1B, the processing device 100 is connected to an intermediary device 180 via an interconnect 192. The sending device 110 is connected to the intermediary device 180 via an interconnect 191. Any of the interconnects 191 and 192 may be, for example, a cellular phone network, an SMS channel, a television channel, a local area network (LAN), wide area network (WAN), metropolitan area network (MAN), global area network such as the Internet, a Fibre Channel fabric, or any combination of such interconnects. In some embodiments, the interconnects 191 and 192 can be within one network, for example, the Internet. The sending device 110 is capable of sending a text sequence 140 to the intermediary device 180 via the interconnect 191. The intermediary device further sends the text sequence 140 to the processing device 100 via the interconnect 192. The processing device 100 receives the text sequence 140 and generates a video sequence 150 based on the text sequence 140. The intermediary device may be, for example, a cellular phone, a conventional personal computer (PC), a server-class computer, a workstation, a handheld computing/communication device, a game console, a television, or the like.

In some embodiments, the intermediary server 180 receives the text sequence and process the text sequence 140 into a set of data. The set of data is transmitted to the processing device 100, instead of the text sequence 140.

Figure 2:
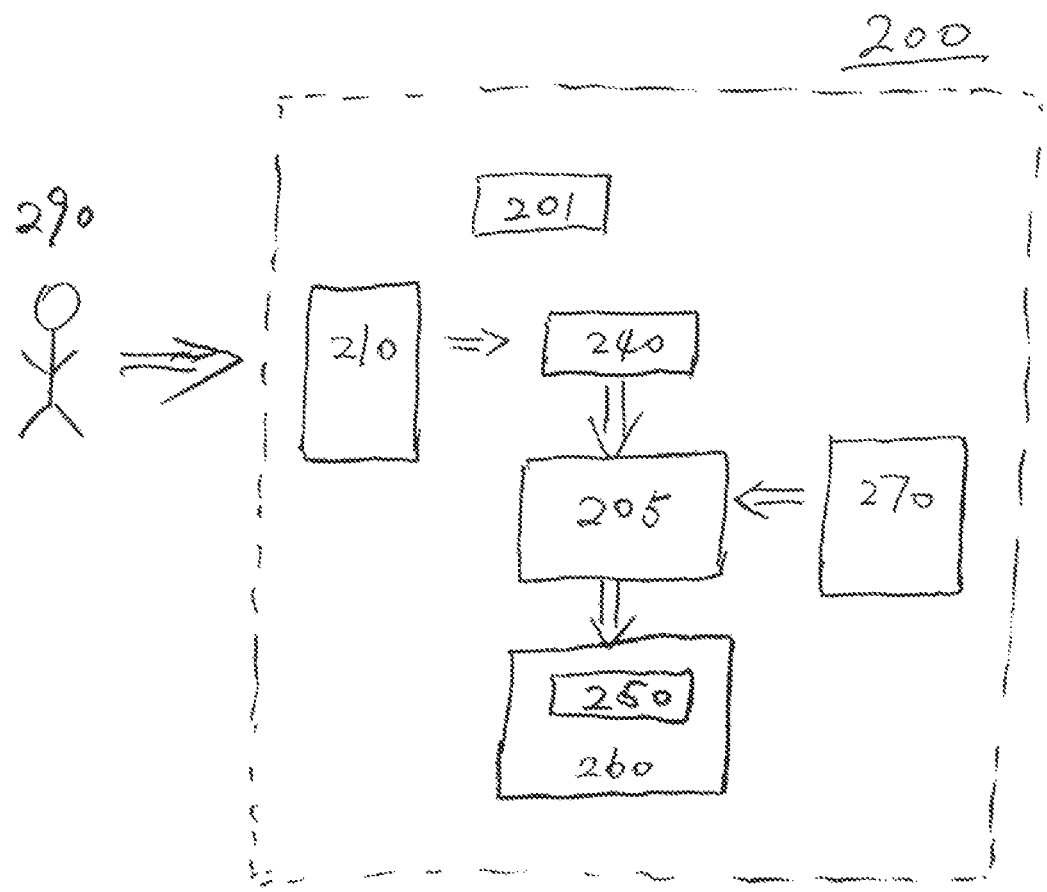
FIG. 2 illustrates an example of a processing device receiving a text sequence from an input component of the processing device.

FIG. 2 illustrates another example of a processing device receiving a text sequence from an input component of the processing device. The processing device 200 includes an input component 210 capable of receiving a text sequence 240 from a human 290. The processing device 200 may be, for example, a cellular phone, a conventional personal computer (PC), a server-class computer, a workstation, a handheld computing/communication device, a game console, a television, or the like. The input component 210 may be, for example, a keyboard, a mouse, an image or video camera, a microphone, game console controller, a remote controller, a sensor, a scanner, a musical instrument, or any combination of such devices.

The processing device further includes a processor 205 to generate a video sequence 250 of a person based on the text sequence 240 and the a priori knowledge of the person 270. The video sequence 250 simulates visual and audible emotional expressions of the person, and the person appears to utter certain words within the text sequence 240 in the video sequence 250. The generated video sequence 250 can be stored in a storage device 260 within the processing device 200. The storage device 260 can be, for example, conventional dynamic random-access memory (DRAM), conventional magnetic or optical disks or tape drives, non-volatile solid-state memory, such as flash memory, or any combination of such devices. The text sequence 240 and/or the a priori knowledge of the person 270 may also be stored in the storage device 260, or in other storage devices separated from the storage device 260.

The processing device 200 contains an operating system 201 that manages operations of the processing device 200. In certain embodiments, the operating system 201 is implemented in the form of software. In other embodiments, however, the operating systems 201 may be implemented in pure hardware, e.g., specially-designed dedicated circuitry or partially in software and partially as dedicated circuitry.

Figure 3:
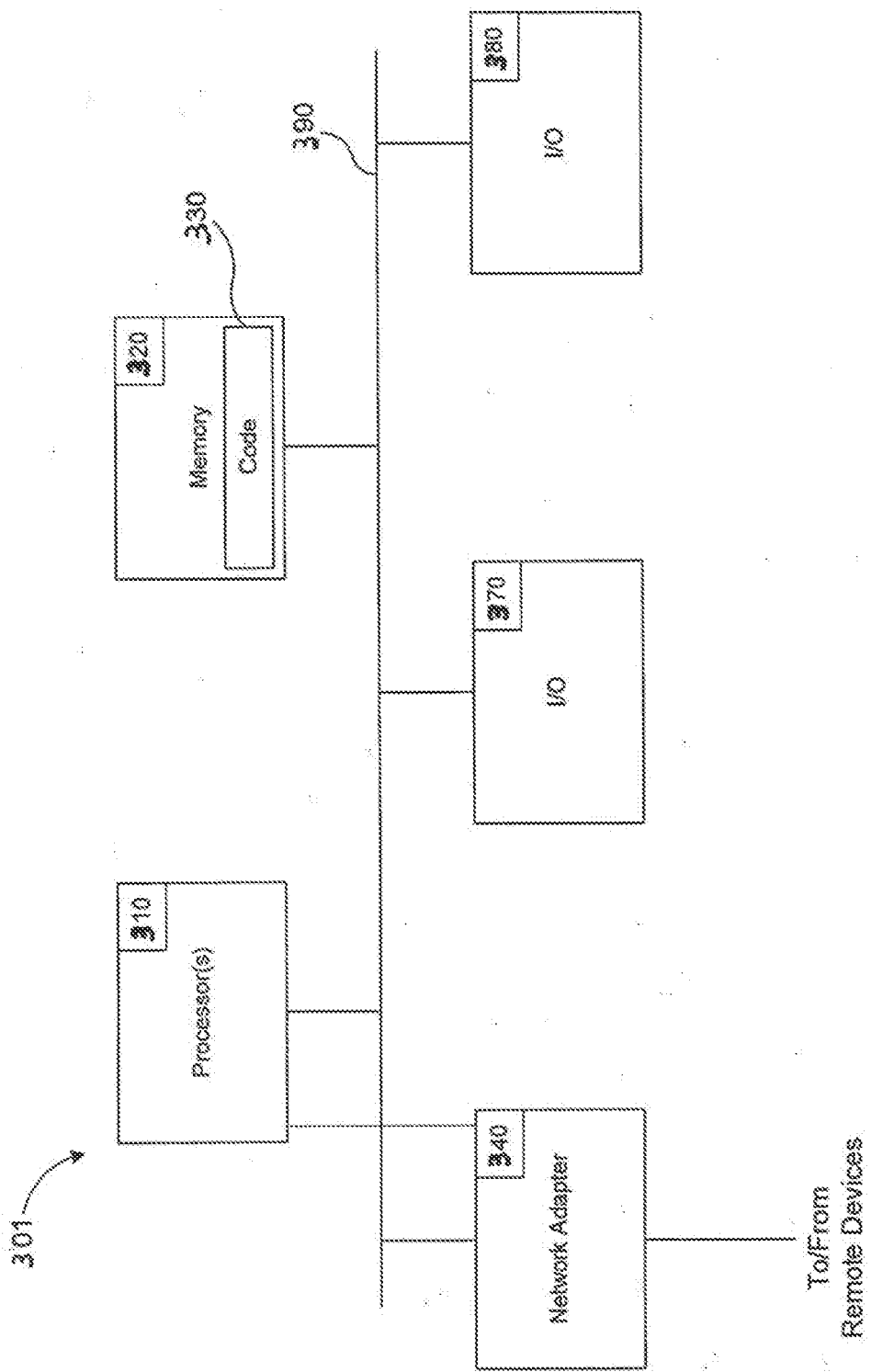
FIG. 3 is a high-level block diagram showing an example of the architecture of a processing device.

FIG. 3 is a block diagram of a processing device that can be used to implement any of the techniques described above. Note that in certain embodiments, at least some of the components illustrated in FIG. 3 may be distributed between two or more physically separate but connected computing platforms or boxes. The processing device can represent a conventional server-class computer, PC, mobile communication device (e.g., smartphone), tablet computer, game console or any other known or conventional processing/communication device.

The processing device 301 shown in FIG. 3 includes one or more processors 310, i.e. a central processing unit (CPU), memory 320, at least one communication device 340 such as an Ethernet adapter and/or wireless communication subsystem (e.g., cellular, Wi-Fi Bluetooth or the like), and one or more I/O devices 370, 380, all coupled to each other through an interconnect 390.

The processor(s) 310 control(s) the operation of the processing device 301 and may be or include one or more programmable general-purpose or special-purpose microprocessors, microcontrollers, application specific integrated circuits (ASICs), programmable logic devices (PLDs), or a combination of such devices. The interconnect 390 can include one or more buses, direct connections and/or other types of physical connections, and may include various bridges, controllers and/or adapters such as are well-known in the art. The interconnect 390 further may include a "system bus", which may be connected through one or more adapters to one or more expansion buses, such as a form of Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

The memory 320 may be or include one or more memory devices of one or more types, such as read-only memory (ROM), random access memory (RAM), flash memory, disk drives, etc. The network adapter 340 is a device suitable for enabling the processing device 301 to communicate data with a remote device over a communication link, and may be, for example, a conventional telephone modem, a wireless modem, a Digital Subscriber Line (DSL) modem, a cable modem, a radio transceiver, a satellite transceiver, an Ethernet adapter, or the like. The I/O devices 370, 380 may include, for example, one or more devices such as: a pointing device such as a mouse, trackball, joystick, touchpad, or the like; a keyboard; a microphone with speech recognition interface; audio speakers; a display device; etc. Note, however, that such I/O devices may be unnecessary in a system that operates exclusively as a server and provides no direct user interface, as is the case with the server in at least some embodiments. Other variations upon the illustrated set of components can be implemented in a manner consistent with the invention.

Software and/or firmware 330 to program the processor(s) 310 to carry out actions described above may be stored in memory 320. In certain embodiments, such software or firmware may be initially provided to the processing device 301 by downloading it from a remote system through the processing device 301 (e.g., via network adapter 340).

Figure 4:
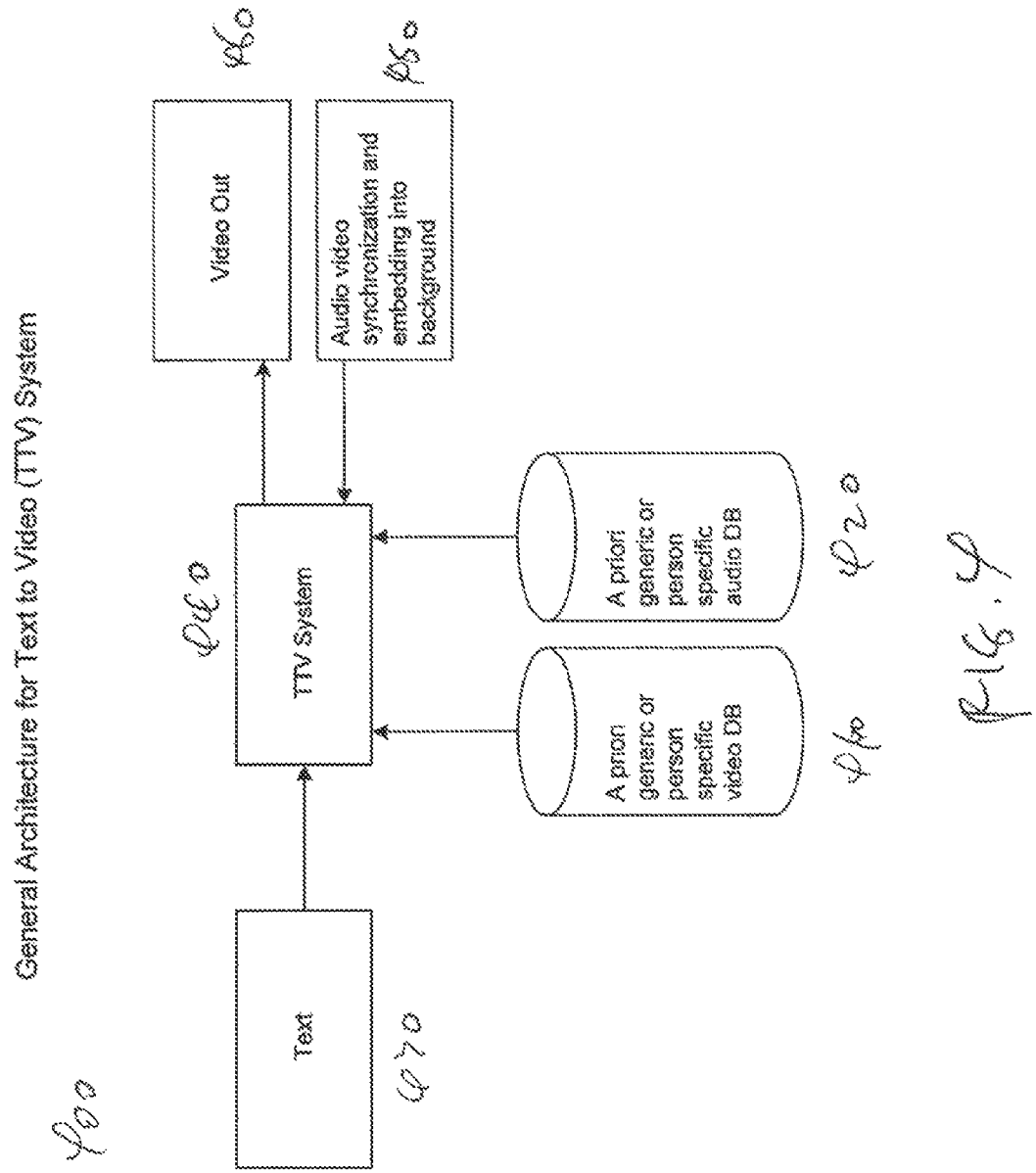
FIG. 4 shows an example architecture for a text to video (TTV) system.

FIG. 4 shows an example architecture for a text to video (TTV) system. The text to video system 400 may be implemented on a single processing device, or on a group of processing devices and/or servers. The system 400 includes a visual database 410 containing a visual model of a person. The person is called "target person", "target individual", or simply "target"; his face is called "target face." The visual model contains a priori information of the person including, for example, images and videos of the target person. After receiving the text 430, the system 400 can create a dictionary mapping contents of the text 430 to facial motions of the target person based on the visual model of the target person. A visual sequence of the target person is created based on the dictionary. In some embodiments, information from the reference individuals is also used to create the visual sequence, as disclosed in details in following paragraphs. A background scene is created in the visual sequence, the target face is overlaid on top of the background scene.

The system 400 also includes an audio database 420 containing an audio model of the target person. The audio model can include a priori information of the target person and reference individuals. There are different approaches to build the audio model and generate the audio sequence for the target person. Details of the approaches are discussed in the following paragraphs. The visual and audio sequences are synchronized and merged into a video sequence of the target person (450). In some embodiments, the video sequence is outputted on a display or to a remote device (460).

Visual Model for Target Person

Figure 5:
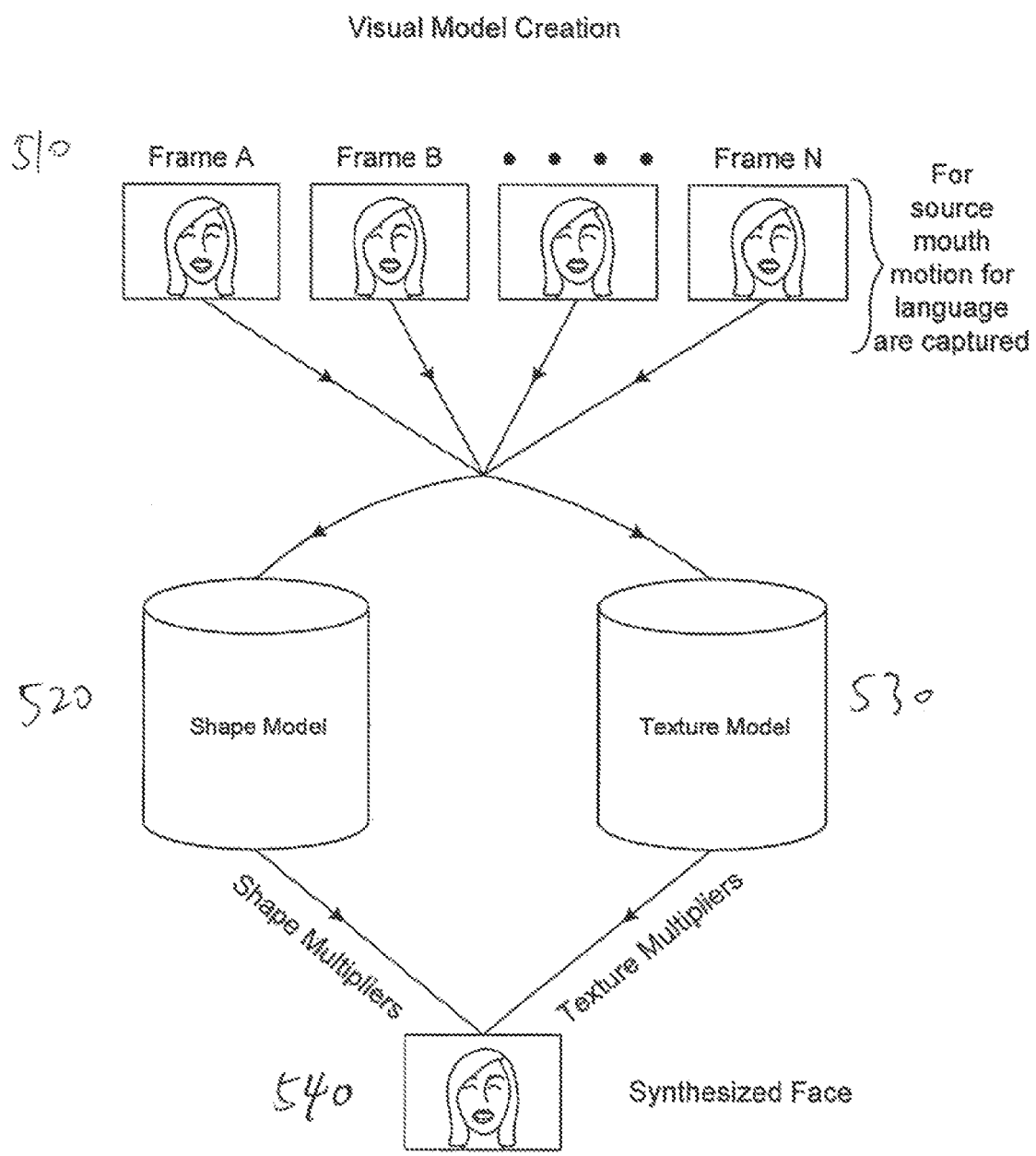
FIG. 5 illustrates an example of building a visual model of a person.

FIG. 5 illustrates an example of building a visual model of a target person, particularly a visual model of the target person's face. The data of the visual model is stored on a processing device which performs the video generation based on text. In one embodiment, the visual model is created by taking one or more sample videos of the person while the person speaking certain words. The number of words that the person spoken needs to be large enough so that a rich representation of the facial, lip and mouth motions of the person is captured in the video. At the stage of visual model creation, it is not necessary that the words being spoken to have a relation to the words that are supplied in later stages for video generation. The general assumption is that there is no prior knowledge of the text that is going to be supplied or inputted for video generation.

What is needed for building the visual model is enough information about the motion of the mouth and face. In some embodiments, even sample videos in different languages can be utilized for budding the visual model. In one embodiment, for example, the training data needed contains about 5 minutes of video. When building the visual model, representative frames from the video that captures typical facial motions are selected as feature points to build the model (510). Feature points are labeled either manually or automatically. These feature points can contain points that represents important or typical facial features of the person (for example when upper and lower lip meet, or when upper and lower eyelids meet), and intermediate points between the important facial features.

For each selected frame, N points on the frame are selected as mesh points for representing the facial features of the person. Thus, each frame defines a coordinate in 2N dimensional Euclidean space (each point is represented by an x and y coordinate). Since these points represent the shape of the face of an individual with different emotions, there are not randomly scattered in the high dimensional space. In one embodiment, a dimensionality reduction method such as principal component analysis (PCA) can be applied to these points. For example, a linear dimensionality reduction method like the PCA can be applied. An ellipsoid about the mean image of the face is defined, and the principal axes are defined as eigenvectors of the data autocorrelation matrix. These principal axes are numbered according to the magnitude of the eigenvalue for the autocorrelation matrix eigenvectors. The eigenvector with the largest eigenvalue represents the direction with maximum variability among the N points. Each eigenvector with a smaller eigenvalue represents variability in less and less important directions. In one embodiment, K largest eigenvectors are sufficient for representing all possible motions of the face realistically. Thus each facial motion is represented as a collection of K numbers; the numbers are called multipliers. Each multiplier denotes the extent of departure from the mean image along the direction of corresponding eigenvectors, among the K most important eigenvectors. These eigenvectors are called shape eigenvectors. The shape eigenvectors form a shape model 520 of the person. In some embodiments, the number K can be made to be adaptive and adjusted based on the type of video that is being processed.

In order to represent the color of the pixels on the face, the mesh points of the mean image are used to produce a triangulation of the mean image. The triangulation process divides the image of the face into a plurality of triangle areas; each of the triangle areas is defined by three of the mesh points. For any other facial motion deviated from the mean image, a corresponding triangulation is created based on the deviated mesh points (relative to the mesh points of the mean image). In one embodiment, for each of the N labeled frames, this triangulation process of mesh points is performed. These triangulations can be used to create a linear mapping from each triangle area in a labeled frame to the corresponding triangle area in the mean image. The pixel values of the N labeled images can then be moved to an image defined inside the boundaries of the mean shape.

PCA is then carried out on these images defined inside the region of the mean image. A number of images are retained after PCA to represent the texture of the face. These retained images are called texture eigenvectors. The texture eigenvectors form a texture model of the person. Similarly to multipliers for shape eigenvectors, multipliers for texture eigenvectors are used to represent the pixel colors (in another word, texture) of the face. A collection of multipliers for the shape eigenvectors and texture eigenvectors are used to recreate the face 540 of the target person realistically. In some embodiments, for example, the total number of eigenvectors (or corresponding multipliers) is about 40 to 50. On a rendering (processing) device, each frame of a facial motion can be recreated by a linear combination of the shape and texture eigenvectors, with the multipliers as linear coefficients. In one embodiment, the eigenvectors are stored on the rendering device.

Shape Model Segmentation

Figure 6:
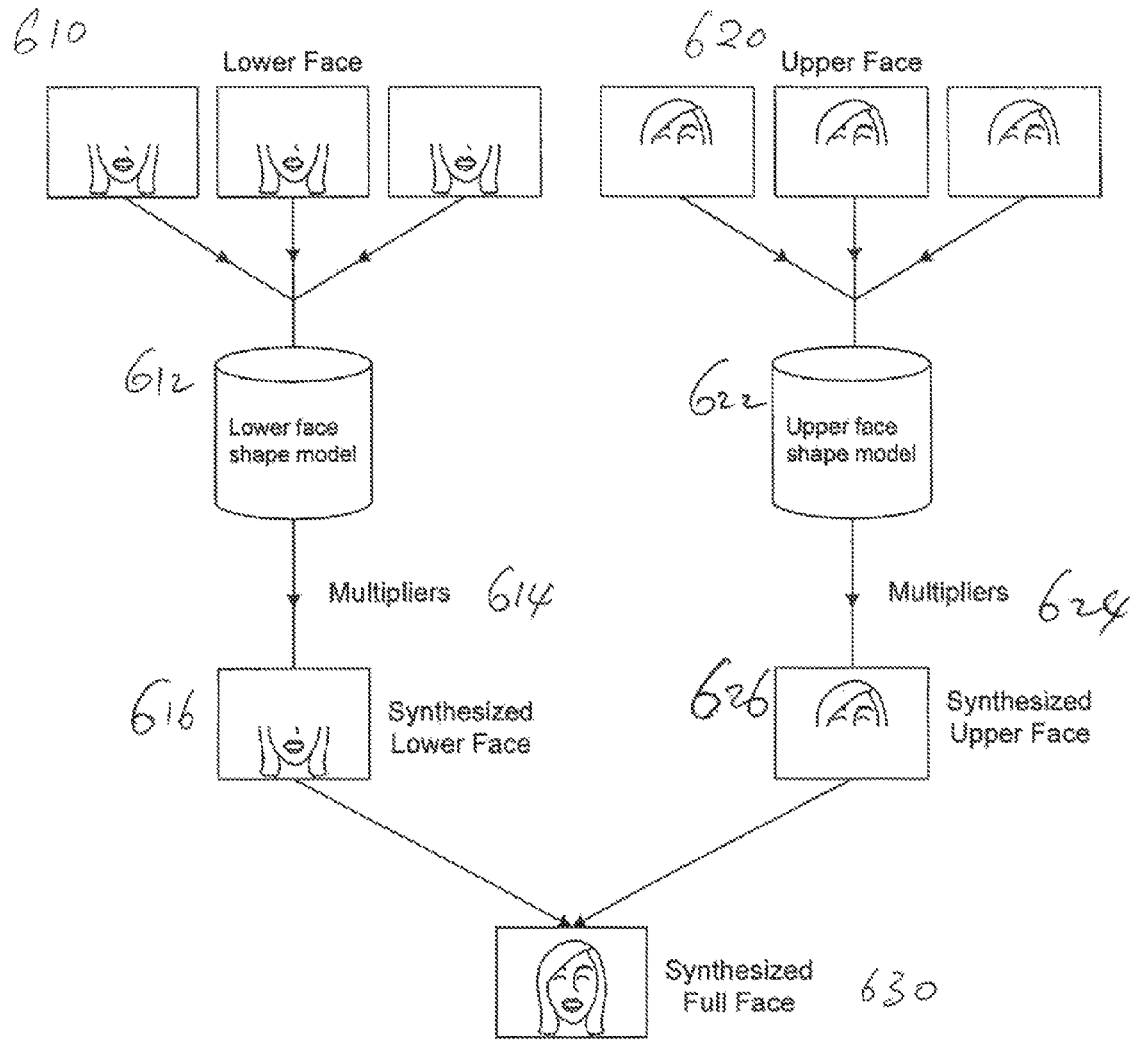
FIG. 6 illustrates an example process of segmenting the face of the target person into two regions.

In some embodiments, the face of the target person can be segmented into multiple regions. For example, FIG. 6 illustrates an example process of segmenting the face of the target person into two regions, the upper region and the lower region. A separate set of shape eigenvectors (610, 620) is used for modeling the lower and upper regions separately. A separate set of multipliers (614, 624) associated to shape eigenvectors (610, 620) is used for modeling the lower and upper regions separately, based on the lower and upper face shape models (612, 622) respectively. Then the synthesized lower region 616 represented by the multipliers 614 are combined with the synthesized upper region 626 represented by the multipliers 624 to generate the synthesized full face 630 of the target person. For generating a video of a person delivering a speech, the lower region can be of greater interest than the upper region. Therefore, the lower region can be represented by more multiplier/eigenvector pairs than the upper region.

Visual Model for Reference Individuals

In some embodiments, visual models of the reference individuals can be created using the similar procedure disclosed above for the target person. In one embodiment, these visual models of the reference individuals are created using larger datasets than the target person, since these models of reference individuals will be used for creating dictionary mapping text contents to facial motions. For instance, a visual model of a reference individual is created by recording the reference individual speaking one or more speeches. The contents of the speeches are large enough in order to reproduce nearly all possible mouth motions occur in a typical speech, with different emotions.

Dictionary Mapping Text to Motions

One or more dictionaries are created for mapping text contents to facial motions based on visual models of reference individuals. In one embodiment, possible text contents are broken down as words, phonemes, and utterances. An utterance can be a sound that can not be represented by existing words. Each of the words, phonemes and utterances can have at least one entry in the dictionary. In some embodiments, a word, phoneme or utterance can have multiple entries in the dictionary. For example, a word can have multiple entries in a dictionary, corresponding to different emotions.

In one embodiment, during the creation of a visual model for a reference individual, the reference model speaks a number of the most common words, in a language for which a person will appear to speak in the generated video. Other words, and words having different emotions, will be reconstructed based on the constituent phonemes using the information from the video recorded for the reference individual.

Each entry in the dictionary is a mapping between a word, a phoneme, or an utterance and a time series of shape multipliers (a time series is also referred to as a frame series, or a sequence in the disclosure herein). For example, assuming that it takes the reference individual a time period of T video frames to perform a facial motion of saying a word "rain," the time series of shape multipliers can be denoted as $f(k,t)$; $k=1$ to $K$, $t=1$ to $T$. At each frame t, the facial motion of the reference individual is represented by K number of shape multipliers $f(k,t)$. Therefore, this collection of total K*T multipliers represents the sequence of facial motion of the reference individual corresponding to the word "rain." Thus, an entry in the dictionary can be:

"rain": $f(k,t)$; $k=1$ to $K$, $t=1$ to $T$.

In one embodiment, entries in the dictionary can be automatically compiled using an automatic speech recognition (ASR) engine. The ASR engine can recognize both words and phonemes. In some embodiments, the ASR engine can further recognize utterances that are not words or phonemes. If the word "rain" is spoken in different emotions, the dictionary can include multiple entries for the word "rain" with different emotions. For example, one entry can be:

"rain"+(emotion of surprise): $f_1(k,t)$; $k=1$ to $K$, $t=1$ to $T$.

In some embodiments, some words are constructed from phonemes. The time series of multipliers for a phoneme does not depend only on the phoneme itself, but also on neighboring phonemes uttered before and after (or the silence before or after the phoneme). Thus the dictionary can include multiple entries of the phoneme. When the entries are used to generate visual sequences, the selection of an entry of the phoneme also depends on the neighboring phonemes (or silence before or after the phoneme) within a supplied text sequence.

Figure 7:
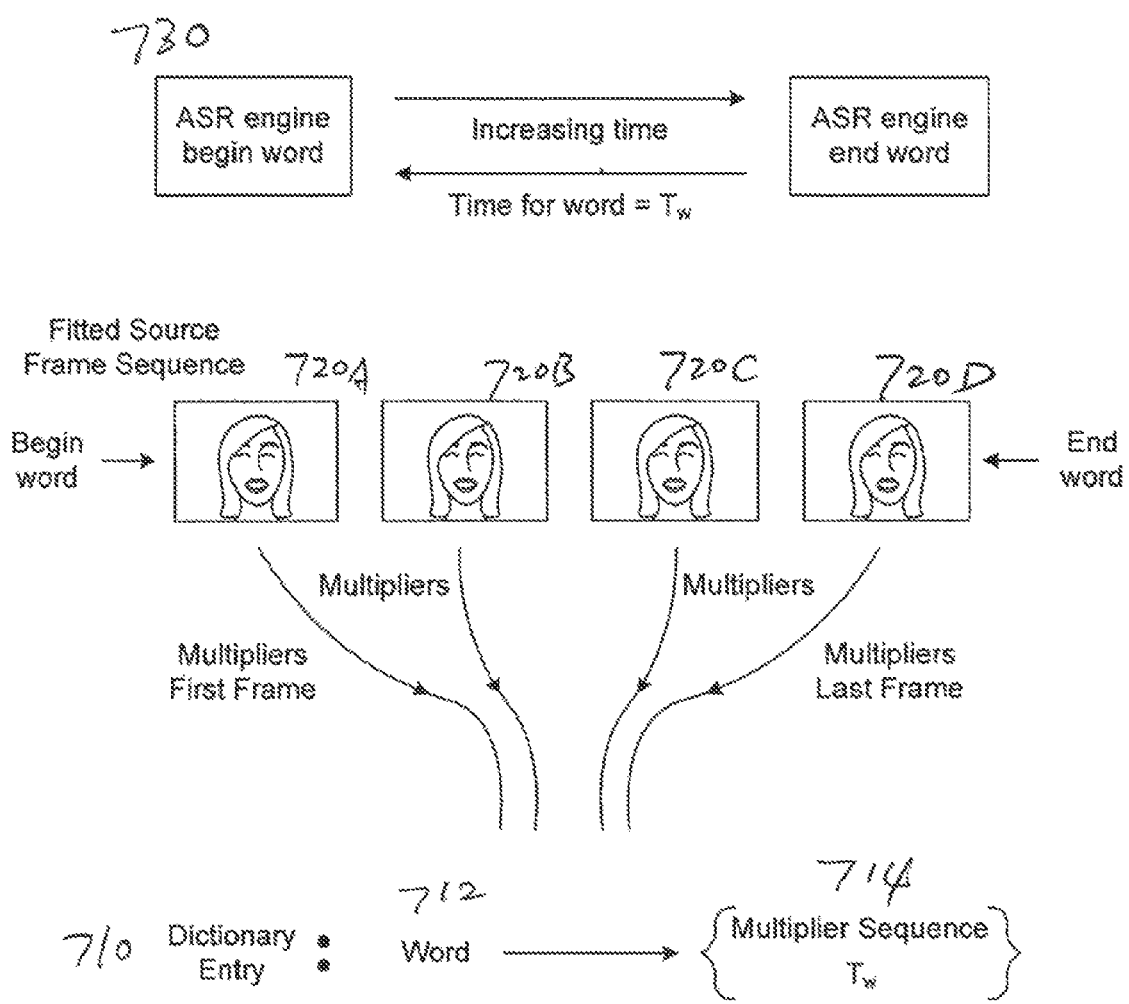
FIG. 7 illustrates an example of a dictionary entry.

FIG. 7 illustrates an example of a dictionary entry 710. The dictionary entry 710 maps a word 712 to a time series of multipliers 714. Each frame 720 of the facial motion is represented by a group of multipliers from the time series of multipliers 714. ASR engine 730 may be used for compiling the entry 710.

Dictionary Optimization by Vector Quantization

In some embodiments, when constructing the dictionary, some words and phonemes included in the dictionary can be uttered many times by reference individuals. This can also result a dictionary including a large number of entries for a single word or phoneme, each entry will map the word or phoneme to a different time series of multipliers. For example, as mentioned previously, in the case of phonemes, selection of dictionary entries for a phoneme can be made on the basis of speech history (i.e. the mouth shape for a particular phoneme is dependent on the neighboring phoneme uttered before or after it). The choices here may still be too many; i.e. the dictionary offers too many choices of entries.

In order to increase predictability and search efficiency, a dictionary can be optimized in the following way. A visual sequence for a speech can be thought as a very large number of points in the space of multiplier values. For example, if a thirty minute video at 30 frames per second is used, we have a collection of 30*1,800*K=54,000*K multiplier values, wherein K is the number of shape eigenvectors used for the visual model. Some of these points represent mouth positions which are very close to each other.

Vector quantization (VQ) can be performed on this collection of 54,000 points in K dimensional space. In VQ, the 54,000 pointer are approximated by M centers of mass (VQ points, VQ centers, or VQ indices)—where each point is replaced by the center of mass it is closest to. The larger the numbers of centers, the better representations the VQ points are for the 54,000 points. Since facial motions represent a highly constraint set of points. There are correlations between multipliers. Thus, an aggressive VQ representation is possible. In one embodiment, the number of VQ centers can be determined such that a maximum error is tolerated; wherein the maximum error can be visually verified to provide acceptable performance of the video.

Therefore, after vector quantization, the dictionary entries will contain time series of VQ centers, instead of time series of multipliers for corresponding eigenvectors. This allows for more compact entries of the dictionary to represent words and phonemes. Multiple entries for a word or phoneme in the original dictionary will likely "collapse" into fewer entries contain times series of VQ centers (since the same utterance made at the different times by a the reference speaker, will likely map into the same time series of VQ centers). Further, this collapse will make the task of selecting a time series for a phoneme based on neighboring phonemes more manageable.

The Audio Model

The aim of the audio model is to create an arbitrary sentence or collection of sentences based on the text given. Multiple techniques for creating an audio model based on text are disclosed in the following paragraphs.

Text to Speech (TTS) Audio Model

Figure 8:
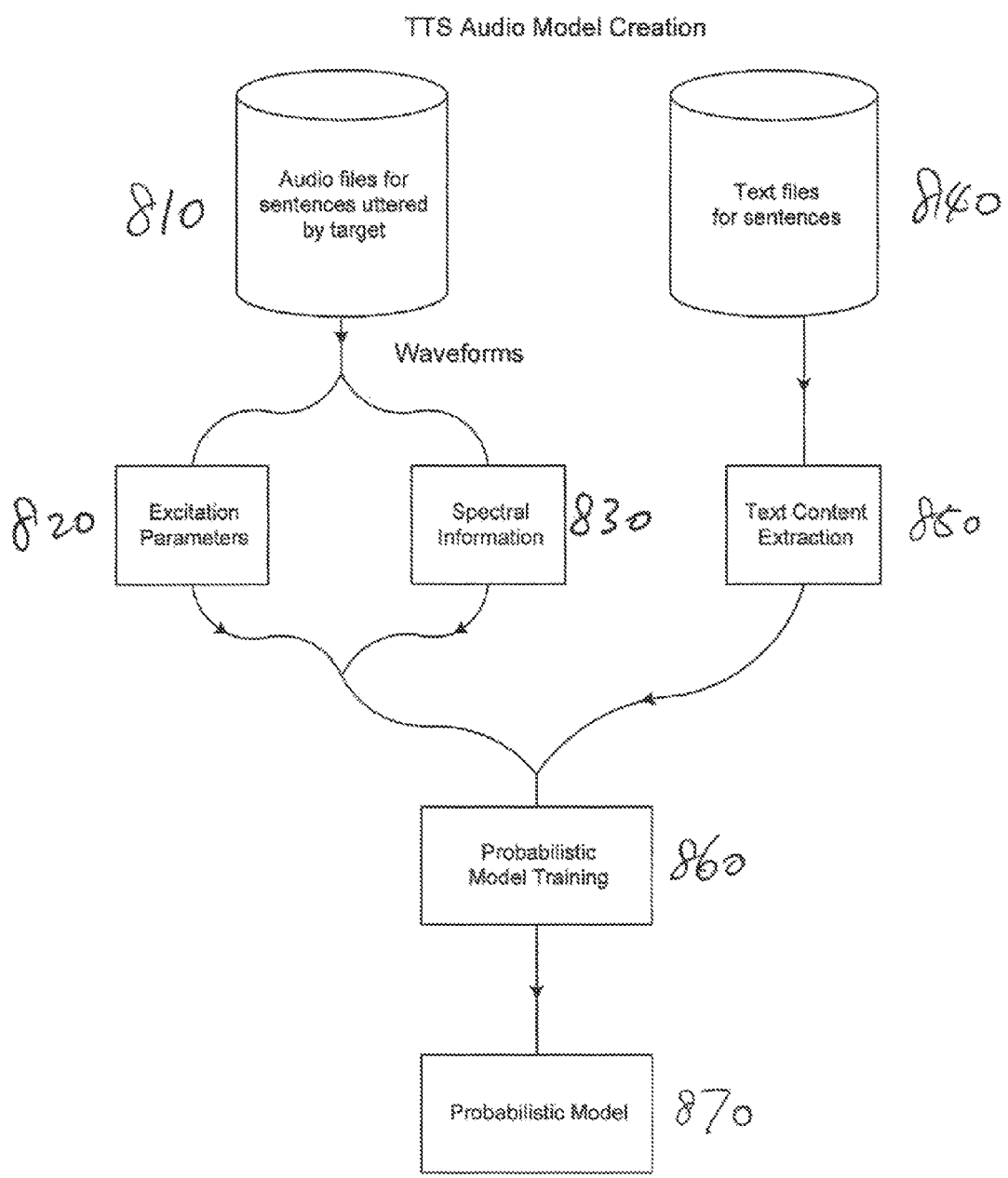
FIG. 8 illustrates an example process of creating text to speech (TTS) audio model.

FIG. 8 illustrates an example process of creating a TTS audio model. In the TTS audio model, in order to create the audio model, speech samples (810) based on text files (840) for the target person are collected. The audio data in the speech samples is used to create a collection of speech features for the target person. In one embodiment, the speech features include excitation parameters (820) and spectral information (830). These speech features and the corresponding extracted text content (850) are inputs used to create and train the audio model (860, 870). Once the audio model is created, new text sequence can be supplied to generate audio. This audio model is a probabilistic model; i.e. given new text sequence, a group of speech features from the audio model are combined into an audio sequence most likely to represent the new text sequence.

Figure 9:
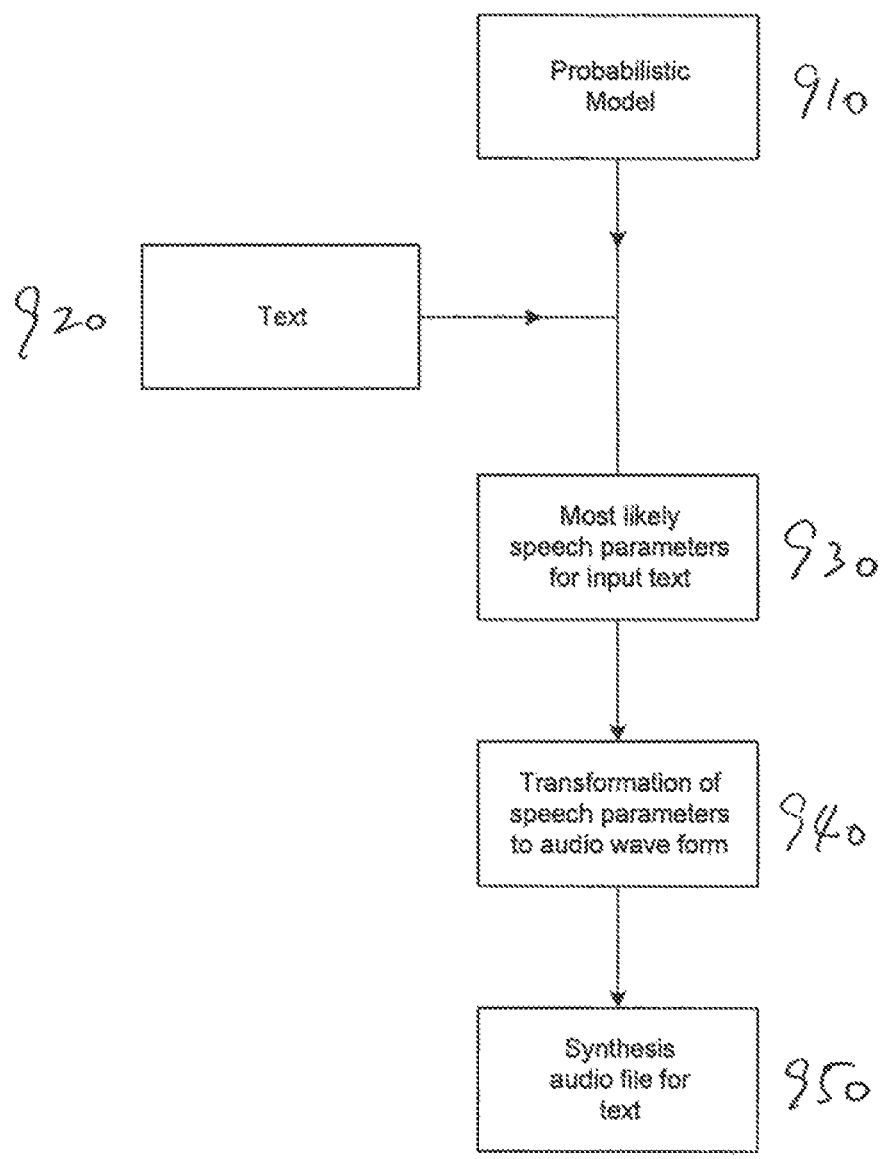
FIG. 9 illustrates an example process of TTS audio synthesis.

For example, FIG. 9 illustrates an example process of TTS audio synthesis. A text 920 is inputted to the probabilistic model 910. At 930, a sequence of parameters representing the speech features is selected by the model to represent the text 910. The speech parameters representing the speech features are transformed by the model to generate audio wave forms; and therefore the audio sequence is synthesized (940, 950).

The output of the TTS system is not just an audio sequence but also can include timing marker (also called timestamps) for words and phonemes. For example, consider that the word "rain" is part of the text to be converted to an audio sequence. The audio model will not only generate the word "rain", but will generate the beginning and end timestamp for this audio sequence for "rain" relative to the beginning time of the generated audio sequence. This timestamp information can be utilized for audio video synchronization which is disclosed in later paragraphs.

The direct TTS model for text to audio synthesis can produce a speech that is directly related to the audio data used to generate the model. The advantage of this technique is that once the model is created, the generation of speech audio only requires the speech text.

Voice Conversion Audio Model

Another technique for creating an audio model is based on the creation of a correspondence between the voices of two speakers. One speaker is the "reference" speaker and the other is the larger speaker. In this technique, speech data based on the same text is collected for the target speaker and the reference speaker. A correspondence is established between the acoustic waveforms for the reference and target voices. This correspondence can then be used to generate audio for new words for the target speaker based on an audio of these new words spoken by the reference voice.

This correspondence between the reference and target voices is established in the following way. Audio samples from the target and reference person speaking the same words are collected. In one embodiment, the audio samples have lengths of several minutes. By analysis of the wave forms, the utterance of reference and target voices are aligned so that a correspondence can be made between the utterances of reference and target voices. Voice features (such as Mel-frequency cepstral coefficients) of both reference and target voices are extracted. A joint histogram between reference and target voices for the distribution of the values of features is created. This joint distribution is modeled by a GMM (Gaussian Mixture Model). A first estimate of the parameters of the GMM is created by vector quantization for feature clusters in the joint histograms. Then the GMM is trained by the EM (Expectation Maximization) Algorithm.

With this technique, a feature of the voice of the reference can be mapped to the corresponding feature for the target. From these corresponding features, an acoustic waveform is generated as an audio sequence for the target person. In some embodiments, the alignment of features in the first step of the procedure is noisy. The generated target voice (as opposed to the original target voice) can be substituted into the algorithm as inputs in order to run it iteratively until a convergence is achieved.

There are a couple of advantages to this voice conversion model. The first is that emotional state of the speech will be transferred from the reference to the target. The second is that if a video of the reference is also produced for the speech, it can aid in higher quality video rendering of the target. Thus, for example, the voice conversion model can be useful for entertainment purposes when particular and precise emotional effects for the target are required.

PCA Based Voice Conversion

The basic GMM base voice conversion can be enhanced for both effectiveness and speed, by use of PCA (principal component analysis). In this case, the GMM voice convergence training is performed for a single reference voice and multiple target voices. The multiple trained GMM for different target voices can be put through the PCA procedure, which naturally decomposes variability in voices.

Provided the sample of target voices generated is large enough, adding a new target voice no longer requires multiple minutes audio sample collection and training of a new GMM. Instead only a speech sample for a short duration of the new target is acquired and its GMM parameters determined by decomposition into the PCA eigenvectors, which are based on previously trained GMMs. With a rich enough training set of original source to multiple GMMs for different targets, the quality of the generated voice will also be enhanced, since the PCA will remove variability due to noise within a single GMM procedure.

In a summary of the technique, reference data is converted to multiple trained target GMMs. A PCT model is generated for the multiple trained target GMMs. For a new target person, PCA decomposition is performed to synthesize the audio sequence for the new target person, wherein only limited training data is required from the new target person.

TTS Based PCA Voice Conversion

The reference voice mentioned in the previous section does not have to be a natural human voice. It can be a high quality TTS generated voice. This TTS generated voice does not need to be a voice of a particular individual. The exact same procedure as the previous section can be carried out, with the difference of that the reference voice is a high quality synthetic TTS instead of a voice from a reference individual.

The advantage of using a fixed synthetic TTS source is that in order to generate the voice of a new target, there is no need to go back to the human source for generation of the source audio for a new set of words. Therefore, only a text sequence is needed as inputs for the video generation.

Audio Video Synchronization

Synchronization of the generated visual and audio sequence can be achieved in different ways depending on whether the direct TTS or voice conversion method was used to create the audio synthesis. The methods may require establishing a relationship between the visual models of the reference individual and the target person. This relationship is generated by an alignment of the shape eigenvectors of reference and of the target. The alignment is represented by transformation matrices which need to be computed one time only and shared on the rendering (processing) device. The size of these transformation matrices is small. Assuming that the target person is represented by 20 shape eigenvectors and 23 texture eigenvectors and the dictionary is compiled based on a reference individual represented by 18 shape eigenvectors and 25 texture eigenvectors. Thus, the transformation matrices are 20×18 and 23×25 matrices for shape eigenvectors and texture eigenvectors respectively. For purposes of transformation, only these matrices need to be stored on the rendering device. Storing databases of reference individuals used to create the dictionaries is not required on the rendering device.

Synchronization with Voice Conversion Audio Model

When target audio is generated with the voice conversion method, the process for synchronizing with the video is the following. An audio is generated based on a reference individual for whom we have both a video and an audio model. The multipliers for shape eigenvectors and texture eigenvectors for the reference individual are computed. These multipliers are transformed to multipliers for shape eigenvectors and texture eigenvectors for generating the visual sequence of the target person.

This generated visual sequence of the target person contains facial motions and hp motions that needs to be synchronized with the audio sequence of the target person, any emotions exhibited in the audio sequence. Thus the video sequence for the target person can be achieved by transforming both the audio model (via audio conversion) and the video model from reference individual to target person. Emotion effects can be achieved by recognizing the emotions in the reference individual's audio and/or visual data.

Synchronization with Direct TTS Audio Model

If the audio for the target is generated with the TTS technique disclosed in previous paragraphs, a dictionary mapping word and phoneme to time series of multipliers is used to achieve a synchronized video synthesis. As mentioned above, the alignment transformation matrices can be used between reference and target video models. In one embodiment, if the target person is a reference individual whom a dictionary is based on, the alignment transformation matrices are not required, and the dictionary can be used to directly align the audio and visual sequences of the target person. In other embodiments, there are no dictionaries based on the target person. Multipliers are computed based on a dictionary of a reference individual, and then these multipliers are transformed to multipliers for the target person using the one time computed alignment transformation matrices.

Figure 10:
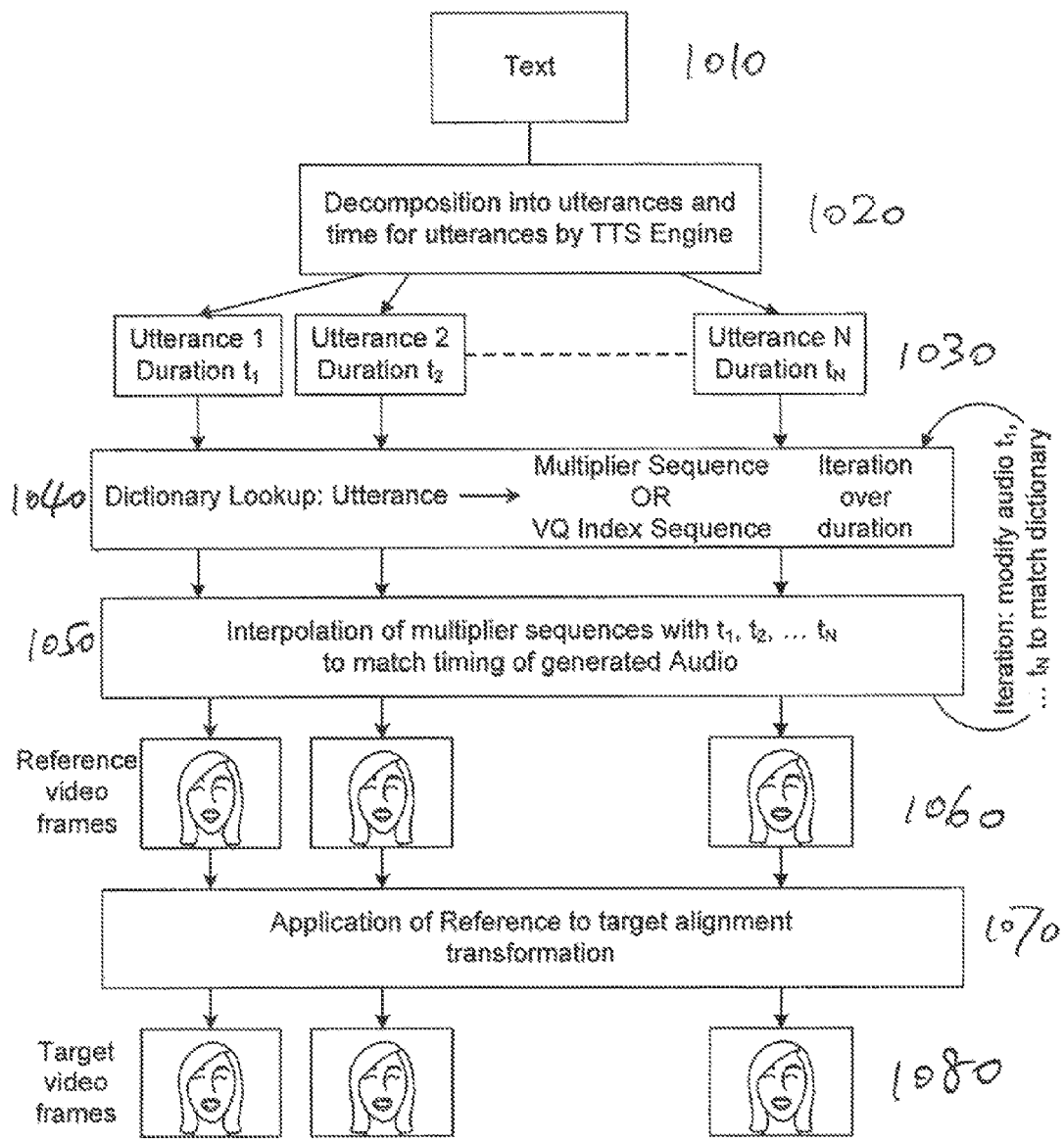
FIG. 10 illustrates an example process of synchronization between the visual and audio sequences.

FIG. 10 illustrates an example process of synchronization between the visual and audio sequences. Text 1010 is decomposed into words, phonemes, or utterances (1020). Each word, phoneme, or utterance has a time duration 1030. Each word, phoneme, or utterance is matched with an entry in a dictionary (1040). The entry contains a time series of multipliers or VQ centers (also called VQ index). The procedure checks if the duration of word or phoneme in the audio generated by the TTS system matches the duration of the corresponding visual motion produced by the dictionary. If the durations do not match, the situation can be remedied by the beginning and ending timestamps provided by the TTS system. The ratio of these durations can be used to generate by interpolation a time series of multipliers which match the timestamps from the audio (1050). In this way synchronization between TTS generated audio sequence and dictionary generated visual sequence is achieved.

Therefore, the properly synchronized frames of a visual sequence 1060 for a reference individual are generated, by applying a reference to target alignment transformation (1070) to generate video frames 1080 for a target person.

Stitching Generated Video to the Background

The above section focuses on generating appropriate facial motions and mouth motions of the target person. For a complete video of the target person, other parts of the body (notably the hair, neck and shoulders) have to be generated. The "background" in this disclosure can include two regions: (1) body parts of the target person which are not generated by the visual model; and (2) the scenery separate from the body of the target.

The task of embedding the synthesized video into a background is a layering procedure. The scenery is "covered" by the body parts and the synthesized video part fills out the remainder of each frame. In one embodiment, there is no restriction on the choice of scenery of the video synthesis. For example, a user can select desired scenery from a menu to achieve certain effects.

There are more restrictions on the body parts of the target that are not generated by the visual model, since the body parts need to fit naturally with the facial portion of the target person. There are multiple techniques to address this part of the embedding disclosed in the following paragraphs, and these techniques may be combined with each other.

Embedding by Minimization of Boundary Fitting Error

Figure 11:
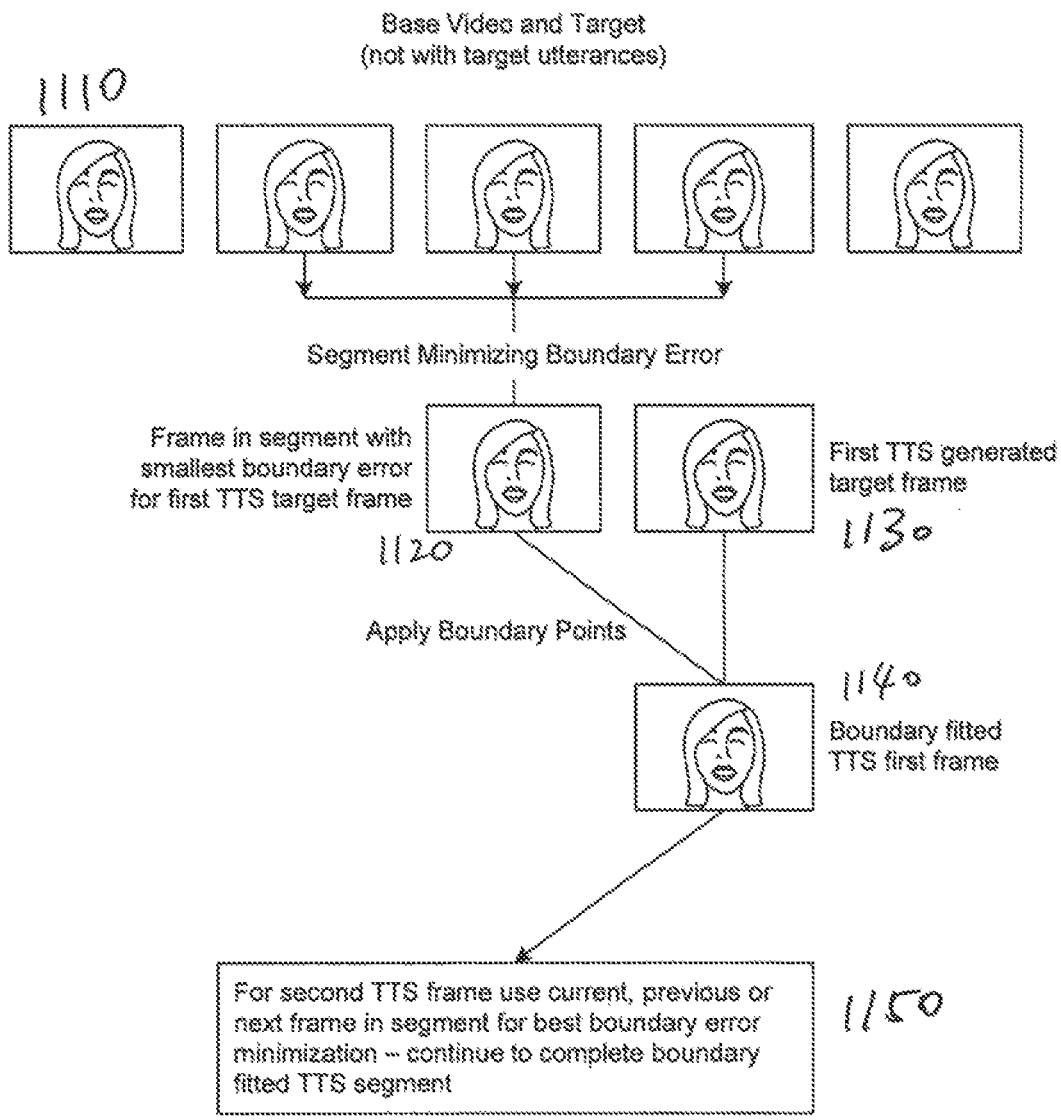
FIG. 11 illustrates an example process of embedding the synthesized video into background by minimizing boundary fitting error.

FIG. 11 illustrates an example process of embedding the synthesized video into background by minimizing boundary fitting error. For each frame 1110 of the generated target video (which for now the visual portion of the video only includes the synthesized facial portion of the target person) and a background video are stitched together. Coordinates of the boundary points of the facial portion are computed and stored. A search is conducted in the background video, for an optimal segment of the background video which results minimum difference between boundary of the segment and boundary points of the synthesized video. Once the optimal background segment is identified, an optimal frame (1120) in the background video is determined, with which boundary error with the first frame (1130) of the synthesized target video is minimized. Next the points in the boundary of the synthesized target video are moved to the background video. Based on the coordinates of interior (target) and exterior (background) points, the shape multipliers are adjusted and resynthesized, for a realistic synthesis of the target person. Repeat this procedure until the boundary points are within certain tolerated error of the background boundary points. The synthesized part of the face now is embedded inside the non-synthesized part (1140). The facial motion (in particular the mouth position) is minimally affected, because a frame from the background video is chosen for minimizing the embedding error as discussed above.

Now proceed to the next synthesized frame of the video sequence. The same boundary error is computed for the next synthesized frame, the currently used frame and the previous frame of the background video. Among these three frames, find the one minimizing the boundary error and repeat the iterative procedure outlined above in order to embed the second frame. This procedure is repeated for each frame of the synthesized video (1150).

Embedding by Segmentation

Figure 12:
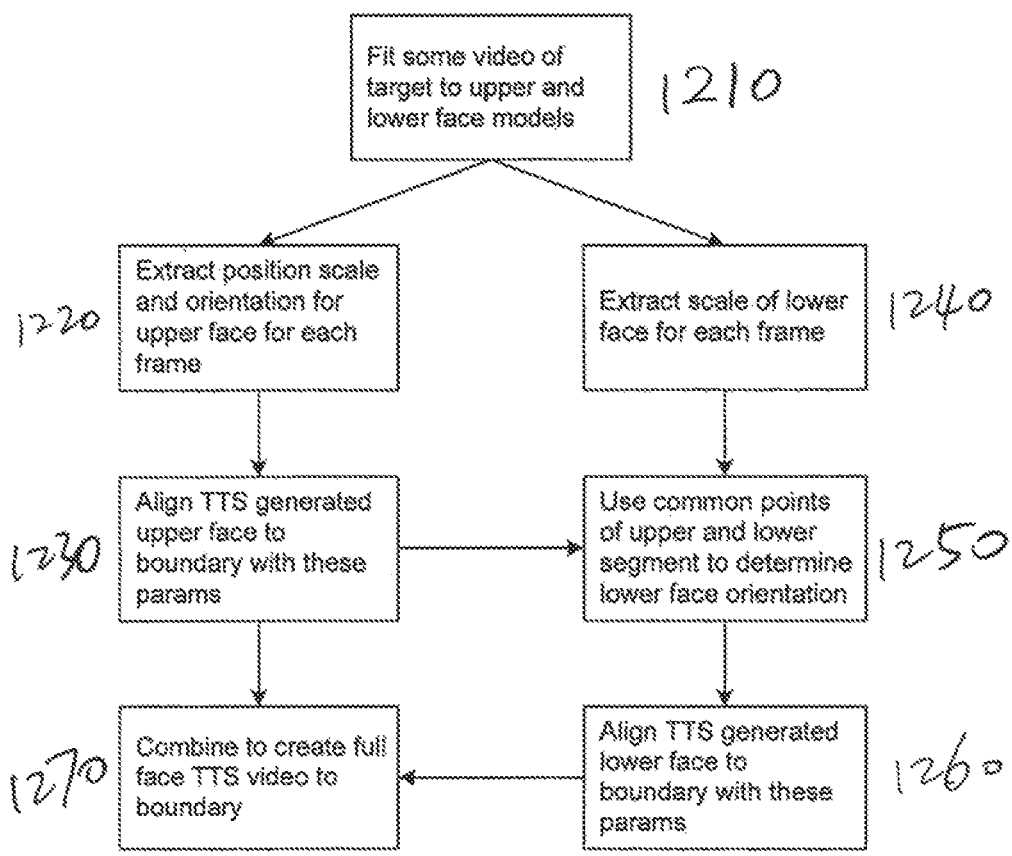
FIG. 12 illustrates an example process of embedding the synthesized video into background based on a two segments model.

As mentioned in previous paragraphs, separate models could be used for the upper and lower portions of the face. FIG. 12 illustrates an example process of embedding the synthesized video into background using a two segments model. In the model, the upper and lower portions of the face are fitted into an existing video of the target person, called background video (1210).

The upper boundary points are relatively rigid (being on the forehead) and the upper face may be embedded into the background by moving all points in the upper section with a simple rigid transformation 1220 (including scaling and changing orientation) to align with the top section to the boundary (1230).

The lower segment may not be embedded into the background in the same manner as the upper segment, because the boundary points of the lower segment are non-rigid (in fact the jaw points are associated with speaking and are on the boundary). However some information can still be acquired from the synthesized boundary. The lower face can be scaled to a proper size, in order to embed the lower face into the background (1240). This provides a scaling parameter to help stitching the lower segment to the upper segment.

The upper and lower segments are then connected to each other in the following manner. The connection of the lower and upper sections is carried out in such a way that the two segments have at least three points in common. These common points determine how to translate, rotate and scale the lower segment, in order to be connected to the upper segment (1250). The lower segment is aligned according to the common points (1260), and upper and lower segments are combined to create a full face to be embedded (1270).

Regions of Interest

Background can be split into multiple regions of interest (ROIs). For example, regions such as neck and shoulder can be included in a region of interest. The border of the synthesized visual sequence is tracked. A frame having the best fitting between the synthesized visual sequence and the region of interest including the net and shoulder can be chosen as the basis for embedding the synthesized visual sequence into the background video. The techniques of utilizing regions of interests are discussed in details in U.S. patent application Ser. No. 13/334,726, which is incorporated herein by reference.

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

In one embodiment, a method is introduced. The method comprises: inputting a text sequence at a processing device; and generating, by the processing device, a video sequence of a person based on the text sequence to simulate visual and audible emotional expressions of the person, including using an audio model of the person's voice to generate an audio portion of the video sequence.

In a related embodiment, the processing device is a mobile device, the text sequence is inputted from a second mobile device via a Short Message Service (SMS) channel, and said generating a video sequence of a person comprises generating, by the mobile device, a video sequence of a person based on shared information stored on the mobile device and the second mobile device.

In another related embodiment, the text sequence includes a set of words including at least one word, and wherein the video sequence is generated such that the person appears to utter the words in the video sequence.

In another related embodiment, the text sequence includes a text representing an utterance, and wherein the video sequence is generated such that the person appears to utter the utterance in the video sequence.

In another related embodiment, the text sequence includes a word and an indicator for the word, the indicator indicates an emotional expression of the person at a time in the video sequence when the person appears to utter the word in the video sequence, the indicator is within a predetermined set of indicators, and each indicator of the predetermined set of indicators is associated with a different emotional expression.

In another related embodiment, said generating a video sequence comprises generating, by the processing device, a video sequence of a person to simulate visual and audible emotional expressions of the person based on the text sequence and a priori knowledge of the person.

In another related embodiment, the a priori knowledge includes a photo or a video of the person.

In another related embodiment, said generating a video sequence comprises: mapping words in the text sequence to facial features of the person; and rendering the facial features of the person in a background scene.

In another related embodiment, the words are mapped to the facial features based on one or more indicators for the words, wherein the indicators indicate emotional expressions of the person at a time in the video sequence when the person appears to utter the words in the video sequence.

In another related embodiment, the facial features include a generic facial feature that applies to a plurality of persons.

In another related embodiment, the facial features include a specific facial feature that applies specifically to the person.

In another related embodiment, said generating the video sequence further comprises generating body gestures of the person compatible with the facial features of the person.

In another related embodiment, said generating the video sequence comprises generating an audio sequence representing speech of the person based on words in the text sequence, by using the audio model based on the person's voice.

In another related embodiment, the receiving of a text sequence comprises: receiving a text sequence in real-time; wherein the generating of a video sequence comprises: generating a video sequence of a person in real-time based on the text sequence to simulate visual and audible emotional expressions of the person, including Using an audio model of the person's voice to generate an audio portion of the video sequence.

In another embodiment, another method is introduced. The method comprises: inputting a text sequence at a processing device; generating, by the processing device, a visual sequence of a person based on the text sequence to date visual emotional expressions of the person, wherein a face portion of each frame of the visual sequence is represented by a combination of a priori images of the person; generating, by the processing device, an audio sequence of the person based on the text sequence to simulate audible emotional expressions of the person, using an audio model of the person's voice; and producing, by the processing device, an video sequence of the person by merging the visual sequence and the audio sequence, wherein the visual sequence and the audio sequence are synchronized based on the text sequence.

In another related embodiment, the face portion of each frame of the visual sequence is represented by a linear combination of a priori images of the person, and each a priori image of the a priori images of the person corresponds to a deviation from a mean image of the person.

In another related embodiment, said generating a visual sequence of a person based on the text sequence comprises: dividing each frame of the visual sequence into two or more regions, wherein at least one of the regions is represented by a combination of a priori images of the person.

In another related embodiment, the audio model of the person's voice includes a plurality of voice features created from speech samples of the person, each voice feature of the plurality of voice features corresponds to a text.

In another related embodiment, each voice feature of the plurality of voice features corresponds to a word, a phoneme, or an utterance.

In another related embodiment, the audio model of the person's voice includes a plurality of voice features created from speech samples of the person, a second person's speech according to the text sequence, and a correspondence between the person's voice wave forms and the second person's voice wave forms; and wherein the person's voice features are mapped to the second person's speech based on the correspondence between the person's voice wave forms and the second person's voice wave forms.

In another related embodiment, the audio model of the person's voice includes a plurality of voice features created from speech samples of the person, a speech generated by a text-to-speech model according to the text sequence, and a correspondence between the person's voice wave forms and the text-to-speech model's voice wave forms; and wherein the person's voice features are mapped to the speech based on the correspondence between the person's voice wave forms and the text-to-speech model's voice wave forms.

In another embodiment, another method is introduced. The method comprises: creating a text sequence, wherein the text sequence represents one or more words that a person is to utter in a video sequence to be generated using an audio model based on the person's voice, to visually and audibly represent a range of emotional expressions of the person; identifying an indictor associated with a word within the text sequence, wherein the indicator is one in a predetermined set of indicators, each of which indicates a different emotional expression of the person; incorporating the indicator into the text sequence; and sending the text sequence to a device configured to generate the video sequence.

In another related embodiment, said identifying an indictor comprises: selecting an item from a menu of items to be associated with a word within the text sequence, wherein each item in the menu is an indicator suggesting an emotional expression of the person.

In another related embodiment, said identifying an indicator comprises: inserting a markup language string to be associated with a word within the text sequence, wherein the markup language string is from a predetermined set of markup language strings, and each markup language string in the predetermined set of markup language strings is an indicator suggesting an emotional expression of the person.

In another related embodiment, said identifying an indicator comprises: identifying an indicator associated with a word within the text sequence based on an audio sequence of a speaker speaking the word within the text sequence using an automatic speech recognition (ASR) engine.

In another related embodiment, the speaker is a different person from said person.

In another embodiment, another method is introduced. The method comprises: storing a priori information of non-person items in a processing device; and generating a video sequence for the non-person items based on the a priori information of the non-person items that exist in the processing device, wherein each of the non-person items is independently controllable.

In another related embodiment, the non-person items are constrained in relationships to other elements in the video sequence.

What is claimed is:

1. A method comprising:
   inputting a text sequence at a processing device; and
   generating, by the processing device, a video sequence of a person based on the text sequence to simulate visual and audible emotional expressions of the person, including using an audio model of the person's voice to generate an audio portion of the video sequence, said generating being based on a machine learning analysis of a real life video sequence of the person.

2. The method of claim 1, wherein the processing device is a mobile device, the text sequence is inputted from a second mobile device via a Short Message Service (SMS) channel, and said generating a video sequence of a person comprises generating, by the mobile device, a video sequence of a person based on shared information stored on the mobile device and the second mobile device.

3. The method of claim 1, wherein the text sequence includes a set of words including at least one word, and wherein the video sequence is generated such that the person appears to utter the words in the video sequence.

4. The method of claim 1, wherein the text sequence includes a text representing an utterance, and wherein the video sequence is generated such that the person appears to utter the utterance in the video sequence.

5. The method of claim 1, wherein the text sequence includes a word and an indicator for the word, the indicator indicates an emotional expression of the person at a time in the video sequence when the person appears to utter the word in the video sequence, the indicator is within a predetermined set of indicators, and each indicator of the predetermined set of indicators is associated with a different emotional expression.

6. The method of claim 1, wherein said generating a video sequence comprises:
   generating, by the processing device, a video sequence of a person to simulate visual and audible emotional expressions of the person based on the text sequence and a priori knowledge of the person.

7. The method of claim 1, wherein said generating a video sequence comprises:
   mapping words in the text sequence to facial features of the person; and
   rendering the facial features of the person in a background scene.

8. The method of claim 7, wherein the words are mapped to the facial features based on one or more indicators for the words, wherein the indicators indicate emotional expressions of the person at a time in the video sequence when the person appears to utter the words in the video sequence.

9. The method of claim 7, wherein the facial features include a specific facial feature that applies specifically to the person.

10. The method of claim 7, wherein said generating the video sequence further comprises:
    generating body gestures of the person compatible with the facial features of the person.

11. The method of claim 1, wherein said generating the video sequence comprises:
    generating an audio sequence representing speech of the person based on words in the text sequence, by using the audio model based on the person's voice.

12. The method of claim 1, wherein the receiving of a text sequence comprises:
    receiving a text sequence in real-time;
    wherein the generating of a video sequence comprises:
    generating a video sequence of a person in real-time based on the text sequence to simulate visual and audible emotional expressions of the person, including using an audio model of the person's voice to generate an audio portion of the video sequence.

13. A method comprising:
    inputting a text sequence at a processing device;
    generating, by the processing device, a visual sequence of a person based on the text sequence to simulate visual emotional expressions of the person, wherein a face portion of each frame of the visual sequence is represented by a combination of a priori images of the person;
    generating, by the processing device, an audio sequence of the person based on the text sequence to simulate audible emotional expressions of the person, using an audio model of the person's voice, said generating the visual sequence of the person being based on a machine learning analysis of a real life video sequence of the person; and producing, by the processing device, a video sequence of the person by merging the visual sequence and the audio sequence, wherein the visual sequence and the audio sequence are synchronized based on the text sequence.

14. The method of claim 13, wherein the face portion of each frame of the visual sequence is represented by a linear combination of a priori images of the person, and each a priori image of the a priori images of the person corresponds to a deviation from a mean image of the person.

15. The method of claim 13, wherein said generating a visual sequence of a person based on the text sequence comprises:
dividing each frame of the visual sequence into two or more regions, wherein at least one of the regions is represented by a combination of a priori images of the person.

16. The method of claim 13, wherein the audio model of the person's voice includes a plurality of voice features created from speech samples of the person, each voice feature of the plurality of voice features corresponds to a text.

17. The method of claim 16, wherein each voice feature of the plurality of voice features corresponds to a word, a phoneme, or an utterance.

18. The method of claim 13, wherein the audio model of the person's voice includes a plurality of voice features created from speech samples of the person, a second person's speech according to the text sequence, and a correspondence between the person's voice wave forms and the second person's voice wave forms; and wherein the person's voice features are mapped to the second person's speech based on the correspondence between the person's voice wave forms and the second person's voice wave forms.

19. The method of claim 13, wherein the audio model of the person's voice includes a plurality of voice features created from speech samples of the person, a speech generated by a text-to-speech model according to the text sequence, and a correspondence between the person's voice wave forms and the text-to-speech model's voice wave forms; and wherein the person's voice features are mapped to the speech based on the correspondence between the person's voice wave forms and the text-to-speech model's voice wave forms.

20. A method comprising:
creating a text sequence, wherein the text sequence represents one or more words that a person is to utter in a video sequence to be generated using an audio model based on the person's voice, to visually and audibly represent a range of emotional expressions of the person;
identifying an indicator associated with a word within the text sequence, wherein the indicator is one in a predetermined set of indicators, each of which indicates a different emotional expression of the person;
incorporating the indicator into the text sequence; and
sending the text sequence to a device configured to generate the video sequence based on the text sequence and a machine learning analysis of a real life video sequence of the person.

21. The method of claim 20, wherein said identifying an indicator comprises:
selecting an item from a menu of items to be associated with a word within the text sequence, wherein each item in the menu is an indicator suggesting an emotional expression of the person.

22. The method of claim 20, wherein said identifying an indicator comprises:
identifying an indicator associated with a word within the text sequence based on an audio sequence of a speaker speaking the word within the text sequence using an automatic speech recognition (ASR) engine.

* * * * *